C. PEARSON.
NUT LOCK.
APPLICATION FILED DEC. 24, 1913.

1,205,256.

Patented Nov. 21, 1916.

Witnesses:
C. C. Palmer.
F. W. Hoffmeister.

Inventor.
Charles Pearson,
By Chas. E. Lord
Atty.

UNITED STATES PATENT OFFICE.

CHARLES PEARSON, OF CHICAGO, ILLINOIS, ASSIGNOR TO INTERNATIONAL HARVESTER COMPANY OF NEW JERSEY, A CORPORATION OF NEW JERSEY.

NUT-LOCK.

1,205,256.      Specification of Letters Patent.      Patented Nov. 21, 1916.

Application filed December 24, 1913. Serial No. 808,535.

*To all whom it may concern:*

Be it known that I, CHARLES PEARSON, a citizen of the United States, residing at Chicago, in the county of Cook and State of Illinois, have invented certain new and useful Improvements in Nut-Locks, of which the following is a full, clear, and exact specification.

My invention relates to nut locks, and comprises a combined washer and nut lock placed between a nut and an angularly disposed surface, which is operative to prevent a turning movement of the nut, and is at the same time readily released from the nut when required.

The object of my invention is to provide a nut lock especially adapted to use in connection with mower pitmen of the wedge type, which nut lock is simple in form, cheap to manufacture and efficient in operation. These objects are attained by means of mechanism, one embodiment of which is illustrated in the accompanying drawing, in which—

Figure 1:
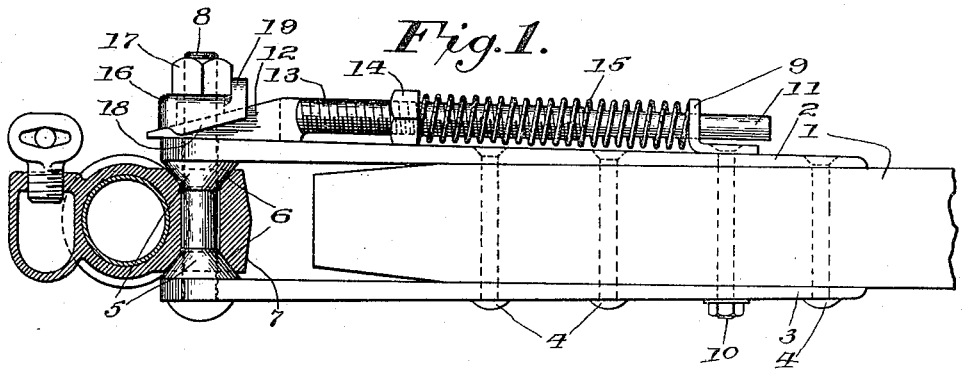
Figure 2:
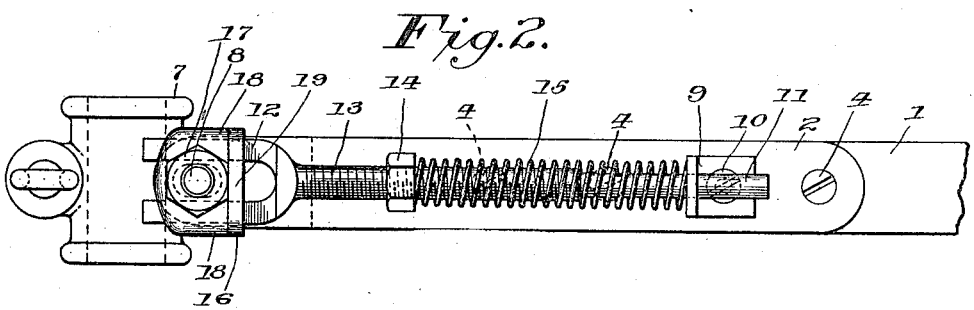

Figure 1 represents a side elevation of part of a mowing machine pitman, partly in section, having my invention embodied in its construction; Fig. 2 is a top plan view of Fig. 1; and Fig. 3 is a top plan view of Fig. 1 on an enlarged scale and illustrating the operation of the device.

Referring to the drawings, wherein the same reference numerals designate like parts throughout the several views, 1 represents part of the body of a pitman, usually made of wood, 2 and 3, respectively, upper and lower resilient jaw members secured to the pitman body by means of rivets 4, and provided at their free ends with inwardly disposed conical bearing members 5, that are received by depressions 6 in a bearing block 7, having the same angular form as the bearing members.

8 represents a bolt passing through openings in the bearing block and securing the parts in operative relation; all of the above named parts being common in pitman construction.

Figure 3:
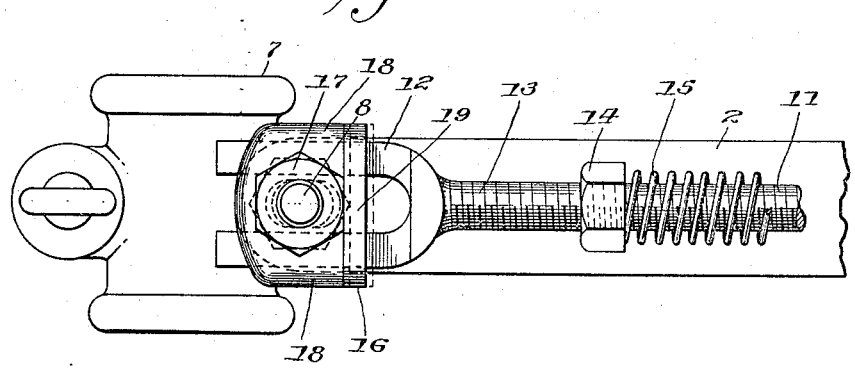

9 represents a clip member secured to the jaw 2 by means of a bolt 10 passing through the body of the pitman, and having an opening therein that slidably receives the rear end of a spring-pressed bearing controlling member 11, having a wedge-shaped head 12 that is slotted to receive the body of the bolt 8, and a threaded part 13 that carries an adjusting nut 14 that regulates the pressure of a compression spring 15 carried by the member 11, and operative between the adjusting nut 13 and the clip member 9 to yieldingly hold the wedge-shaped head of the member 11 in engagement with a combined washer and nut locking member 16 provided with an inclined lower surface corresponding to the angle of the wedge 12, interposed between the nut 17 and the wedge and having ribs 18 upon its lower inclined surface, spaced apart and forming a channel that receives the wedge 12 in a manner preventing a turning movement of the nut locking member 16 relative to the bearing controlling member 11, and 19 represents a transversely disposed rib upon the upper side of the locking member that engages with one of the sides of the nut 17 and locks it against a turning movement; the locking washer being provided with a longitudinally disposed elongated opening that receives the bolt 8 and permits a movement of the washer with the bearing controlling member 11 when the nut 17 is turned, as shown by dotted lines in Fig. 3, and the pressure of the spring 15 automatically returns the washer to a nut locking position when the adjacent side of the nut assumes a position parallel with the rib 19.

When the parts are assembled the conical bearing members 5 are yieldingly held in the depressions in the bearing block 7, and as the parts wear in operation the spring-pressed wedge 12 will operate to close the jaws and maintain the same in constant bearing operation with the bearing block.

While I have in this application specifically described one embodiment which my invention may assume in practice, it is to be understood that the form shown is used for purposes of illustration and that the invention itself may be modified and appear in other forms without departing from its spirit as defined by the scope of the appended claims.

What I claim as my invention, and deside to secure by Letters Patent, is:

1. In combination, a bolt, a nut thereon, a sliding wedge member, a locking washer having an opening therein through which said bolt extends and a lower inclined channeled surface adapted to receive said wedge, said locking washer being provided upon its upper surface with a nut engaging portion disposed transversely of said opening.

2. In combination, a bolt, a nut thereon, a sliding slotted wedge member, a locking washer having an elongated opening therein through which said bolt extends and a lower inclined surface adapted to engage the surface of said wedge, said washer being provided with a nut engaging rib upon its upper surface disposed transversely of said elongated opening.

3. In combination, a bolt, a nut, a sliding slotted wedge member receiving the body of said bolt, a nut locking washer having an elongated opening receiving said bolt, a lower inclined channeled surface receiving said wedge, and a rib upon its upper side disposed transversely to said elongated opening and adapted to engage with said nut.

4. In combination, a bolt, a nut, a sliding spring-pressed slotted wedge member receiving the body of said bolt, a nut locking washer having an elongated opening receiving said bolt, a lower inclined channeled surface adapted to receive said wedge member, and a rib upon its upper surface disposed transversely to said elongated opening and adapted to engage with said nut.

5. In combination, a bolt, a nut, a sliding spring-pressed slotted wedge member having parallel sides and receiving the body of said bolt, a rectangular washer having an elongated opening and lower inclined channeled surfaces which receive said wedge member and a rib member upon its upper horizontal surface disposed transversely to said elongated opening and adapted to engage with a side of said nut.

6. In combination, a bolt, a nut thereon, a washer adjustable longitudinally of said bolt and having a lower inclined surface and a nut engaging portion on its upper surface, a spring pressed wedge member engageable with the inclined surface of said washer, and means whereby upon rotation of said nut said washer may be reciprocated relative thereto.

In testimony whereof I affix my signature, in the presence of two witnesses.

CHARLES PEARSON.

Witnesses:
R. W. MARTIN,
RAY PATTISON.